United States Patent [19]

Simmons

[11] 4,154,466

[45] May 15, 1979

[54] PIPE SECTION AND COUPLING

[75] Inventor: Billy P. Simmons, Mineral Wells, Tex.

[73] Assignee: Centron Corporation, Mineral Wells, Tex.

[21] Appl. No.: 756,186

[22] Filed: Jan. 3, 1977

[51] Int. Cl.² .................... F16L 25/00; F16L 35/00
[52] U.S. Cl. ................... 285/334; 285/332.3;
    285/355; 285/390; 285/423; 285/93
[58] Field of Search ........... 285/355, 333, 334, 332.2,
    285/332.3, 390, 5, 6, 347, 423; 403/343

[56] References Cited

U.S. PATENT DOCUMENTS

| | | | |
|---|---|---|---|
| 1,393,057 | 10/1921 | Vollmer | 285/355 X |
| 2,204,586 | 6/1940 | Grau | 285/355 X |
| 2,500,276 | 3/1950 | Church | 285/355 X |
| 2,931,670 | 4/1960 | Church | 285/355 X |
| 3,069,187 | 12/1962 | Collins et al. | 285/110 |
| 3,468,563 | 9/1969 | Duret | 285/355 X |
| 3,508,771 | 4/1970 | Duret | 285/355 X |
| 3,658,368 | 4/1972 | Hokanson | 285/355 X |
| 3,714,958 | 2/1973 | Johnson et al. | 285/423 X |
| 3,784,239 | 1/1974 | Carter | 285/293 |
| 3,813,115 | 3/1974 | French | 285/355 X |
| 3,841,668 | 10/1974 | Williams | 285/93 |
| 3,876,319 | 4/1975 | Meyer | 403/343 |
| 3,880,451 | 4/1975 | Kinzbach | 285/355 |

*Primary Examiner*—Wayne L. Shedd
*Attorney, Agent, or Firm*—Richards, Harris & Medlock

[57] ABSTRACT

A pipe section is provided having means on the end thereof for use in assembly in the section in series in a pipe system. The pipe section has a compressible seal mounted in a groove in the end. A frusto-conical shaped seal surface is formed on the interior of the female end adjacent the threads. The apex angle of the frusto-conical sealing surface, the lead of the screw threads and the allowable diametric clearance of the seal means are related to provide a pipe joint which allows 360 degrees or a full turn of relative rotation between coupled sections while providing an effective seal therebetween. The compressibility of the seal, the apex angle of the sealing surface and lead of the screw are also related to provide a makeup torque for interconnecting the sections which is in the range which can be applied by an ordinary worker by hand to the section without tools. Indicia means are provided on the exterior of the pipe to indicate allowable interengagement of the sections for effective sealing.

24 Claims, 3 Drawing Figures

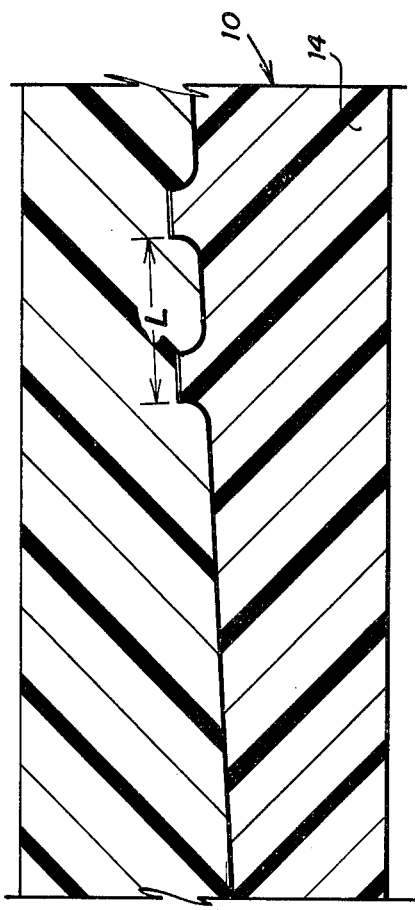
FIG. 6
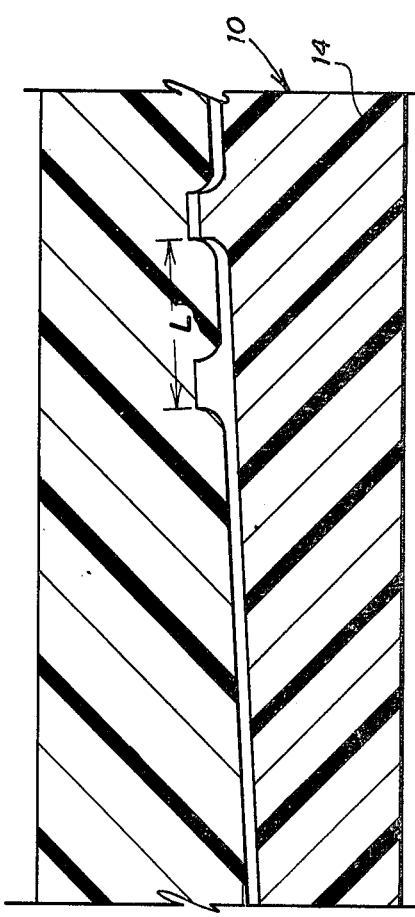
FIG. 5
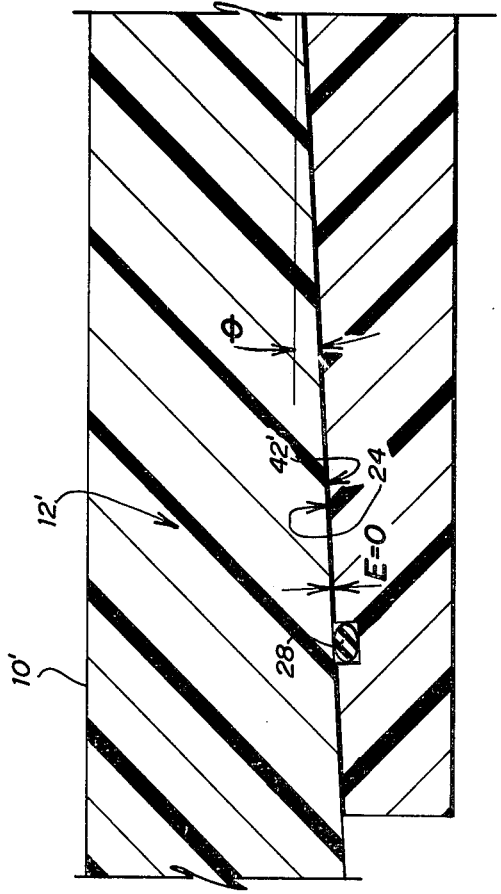
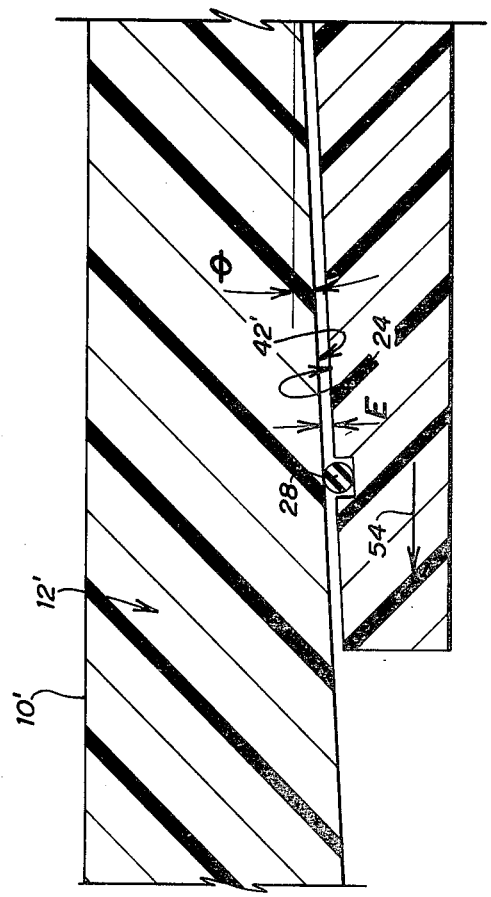

PIPE SECTION AND COUPLING

BACKGROUND OF THE INVENTION

The present invention relates to improvements in pipe sections having couplings on the end thereof. In another aspect, this invention relates to an improved pipe section having couplings which allow at least one full turn of a relative axial rotation between connected sections while providing effective sealing. According to another aspect the present invention relates to an improved pipe section having indicia thereon for indicating proper engagement of the sections. According to even further aspect, this invention relates to an improved pipe section having a required makeup torque for effective sealing which is in the range of application by hand by one worker without the necessity of using equipment, tools and the like.

In the provision of piping systems such as in oilfield flow line pipe applications, it has been common to use pipe sections having threaded couplings on the end thereof for interconnecting the sections to form the system. It has also been typical to utilize pipe sections formed from resin impregnated filament wound materials to form the pipe sections such as is disclosed in the U.S. patents to McLarty, No. 3,572,392, issued Mar. 23, 1971; Carter, et al., No. 3,784,239, issued Jan. 8, 1974; and Meher, No. 3,540,757, issued Nov. 17, 1970. These filament wound sections have proved particularly advantageous for use in an oilfield flow line pipe environment because of their light weight, ability to withstand the pressure ranges of this use and because of their non-corrosive nature.

The use of non-corrosive pipe sections has been hindered by problems present in effectively joining the sections of pipe together. One method of assembling the same is to lay the sections of pipe at the place of intended use and then connect the sections by bonding with adhesive.

This method of assembly poses problems such as the necessity of forming a complete bond between the sections to provide an effective seal and the necessity of waiting while one bond is taking place before the next section can be positioned and connected. In addition, these connections are made under less than ideal conditions wherein contamination may reduce the integrity of these connections.

To eliminate these bonded joints, systems such as is disclosed in the U.S. patent to Carter, No. 3,784,239, have been attempted wherein threaded connections are made to couple the sections together.

The sections using threaded connections also possess problems in that resin impregnated filament pipe sections do not lend themselves well to the use of wrenches. When wrenches are used they tend to compress the pipe, which may result in damage to the pipe that would later cause a failure of the section. In addition, it is sometimes necessary to utilize fittings in the pipe sections such as an elbow to make a right hand turn in the pipe system. It has been found that it is extremely difficult to provide effective sealing between these screw type joints while orientating the fitting in the required direction. One method that has been attempted to alleviate this problem is to cut a section of pipe and bond an elbow or another type of fitting to the end thereof. Unless this bonding is accomplished after the pipe is installed the orientation of the fitting in the proper direction cannot be assured. In addition, if the bond is formed after the section is coupled the additional risk of contamination of the bond occurs.

Thus, although these resin impregnated filament pipe sections have advantages, they are very difficult to use and install.

SUMMARY OF THE INVENTION

Therefore, there is provided according to one embodiment of the present invention an improved resin impregnated filament pipe section having male and female threaded couplings formed on the ends thereof which can be interconnected by hand.

The present invention also contemplates the use of an improved pipe section in which a connection between sections provides at least one full turn of relative axial adjustment between the sections while providing an effective seal.

In addition, the present invention contemplates the use of an improved pipe section having indicia on the exterior thereof indicating to the worker installing the sections when sufficient engagement of the threads is present.

BRIEF DESCRIPTION OF THE DRAWINGS

The present invention will be readily appreciated by those of ordinary skill in the art as the same becomes better understood by reference to the following detailed description when considered in connection with the accompanying drawings in which:

FIG. 5 is a partial enlarged sectional view of the connected pin and socket ends of two sections of tubing illustrating the threads of the two ends engaged to the point of initial effective sealing; and FIG. 6 is a view similar to FIG. 5 illustrating the ends completely engaged.

DESCRIPTION OF THE PREFERRED EMBODIMENT

Figure 1:
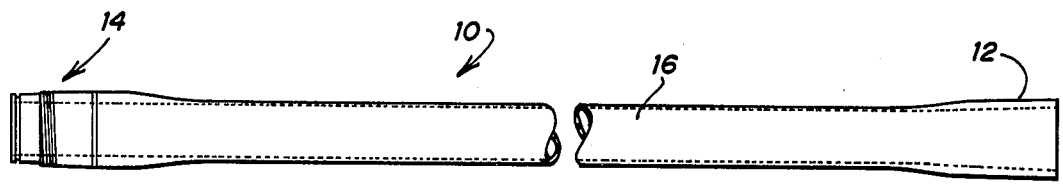
FIG. 1 is a side elevation view of the improved pipe section of the present invention.

Referring now to the drawings, wherein like reference characters designate like or corresponding parts throughout the several views, there is shown the improved pipe section of the present invention, which for purposes of this description is identified by reference numeral 10. The section 10 is provided with a female, socket or bell end 12 and a male pin or spigot end 14 joined together by a central tubing portion 16. The ends 12 and 14 have appropriate mating threads. The section 10 can be constructed in accordance with a conventional method from resin impregnated fiber material.

The section 10 can be used in numerous environments, such as in an oilfield flow line pipe system. When the section 10 is used as an oilfield flow line pipe the sections are constructed with an end to end length of approximately twenty feet and are made in 2 inch, 3 inch and 4 inch and other standard pipe sizes. In an oilfield using pipe system a number of the sections 10 are connected together in series by use of the male and female ends. According to a particular feature of the present invention, the section 10 is constructed in such a manner that it can be connected to another section by hand without the use of special equipment or tools. In addition, couplings can be releasably made to allow disassembly and reuse. No permanent bonds at the joints are necessary to provide an effective seal between the sections.

It is to be understood, of course, that standard fittings (not shown) with threads mating the threads of the section 10 can also be provided. When the dimensional requirements of the environment of use of the sections are such that a right angle fitting is required at the end of one of the sections, a fitting can be provided with mating threads to engage one of the ends of the section 10. When a fitting is required at a spacing located intermediate the length of one of the pipe sections, the section can be cut and a fitting such as a right angle fitting bonded onto the section at the desired location.

According to another particular feature of the present invention, an adjustability is provided in the couplings to provide effective sealing between fittings and sections while allowing the fittings to be positioned in any desired radial direction.

In addition, as will be hereinafter described in detail, the section 10 is provided with indicia on the outside thereof which indicate when a joint is properly made up to provide an effective seal. These indicia allow the workmen installing the pipe to quickly determine when a proper coupling is made between the various sections and fittings.

The socket end 12 and pin end 14 will be described in detail by referring to FIGS. 2 through 6.

Figure 2:
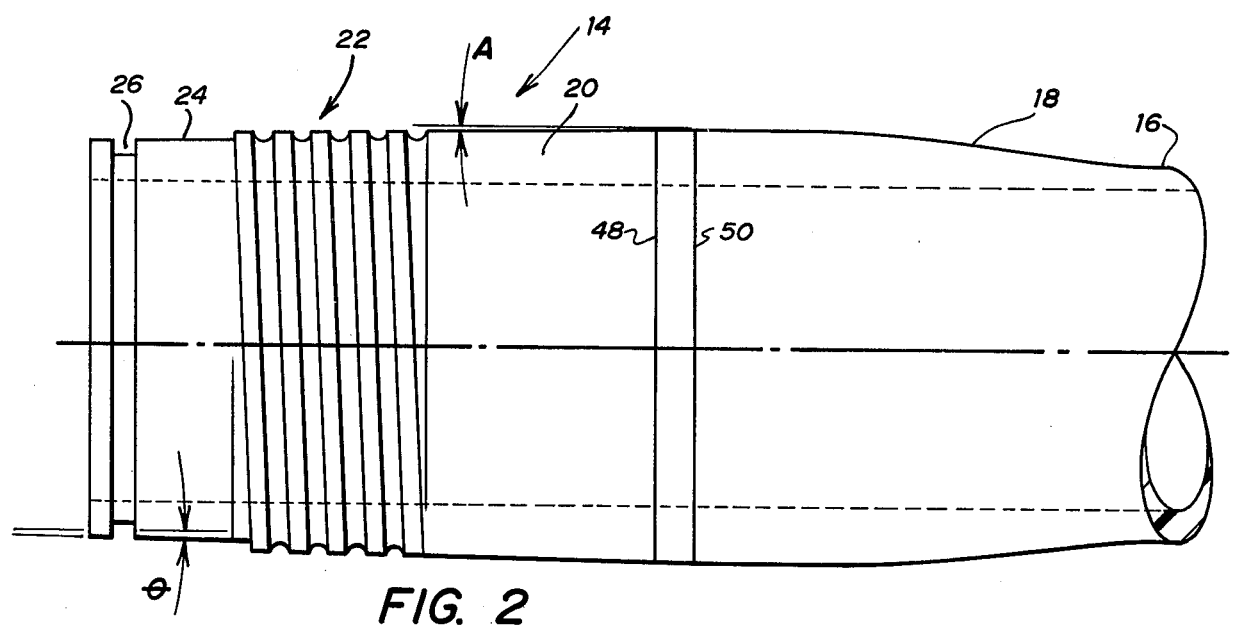
FIG. 2 is an enlarged elevation view of the male or pin end of the improved pipe section of FIG. 1.

Referring particularly to FIG. 2 that details of construction of the pin end 14 will be described. As can be seen, the central tubing portion 16 is flared at 18 to form the pin end 14. The pin end 14 has a larger wall thickness than the central tubing portion 16, but the internal diameter of the central tubing portion 16 is continuous or equal completely through the pin end 14. The flared portion 18 extends from the tubing portion 16 to a guide alignment portion 20 formed on the exterior of the section. The guide portion 20 is frusto-conical shaped and converges in a direction toward the pin end of the section. The frusto-conical section 14 has an apex angle A. A male threaded portion 22 is formed on the exterior of the pin end 14 adjacent to the guide portion 20. In the preferred embodiment the threads 22 have a arcurate cross-section and are bounded on one side by the guide portion 20 and on the other side by a second guide portion or seal carrying surface 24. Portion 24 is frusto-conical shaped and in the preferred embodiment its apex angle is equal to A.

Figure 4:
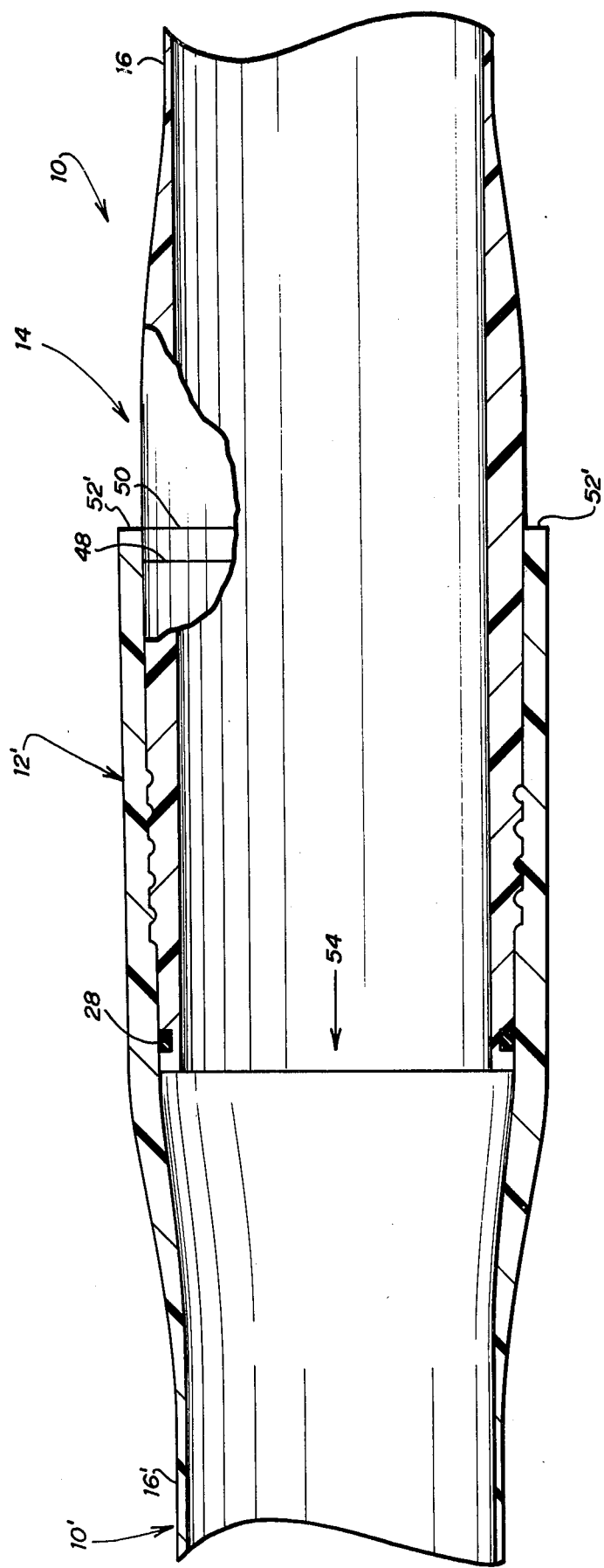
FIG. 4 is a partial longitudinal section of a connection between two of the sections illustrated in FIG. 1.

A groove 26 is formed in the second guide portion 24 and is of a size and shape to receive an annular compressible seal 28 therein. This seal 28 is eliminated from FIG. 2 for purposes of description but is shown in FIGS. 4 through 6.

Figure 3:
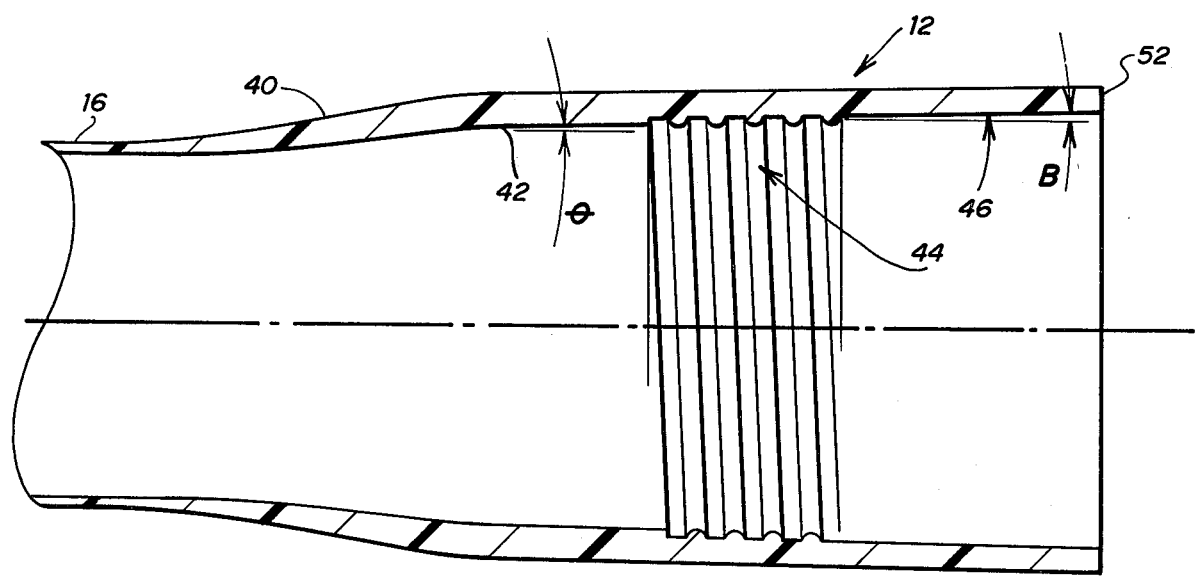
FIG. 3 is an enlarged sectional view of the female or socket end of the section illustrated in FIG. 1 drawn to the same scale as FIG. 2.

Referring now to FIG. 3, it can be seen that the socket end 12 is formed by flared portion 40 which extends from the central tubing portion 16. A sealing or seal engaging surface 42 is formed on the interior of the flared portion 40 and has a frusto-conical shape with an apex angle θ. In the preferred embodiment of the angle θ equals the angle A and surface 42 is appropriately dimensioned to cooperate with the guide portion 24 carrying the seal 28. Surface 42 provides an annular seal engaging surface of the seal 28 to seal the connection of two sections. As can be seen in FIG. 3 the wall thickness of the socket end 12 increases over the wall thickness of the central interior of the end 12. The threads of portion 44 are selected of a size to provide threaded engagement with the threads 22 and to allow innerconnection of two sections 10 together. Threads 44 have an arcurate cross-section corresponding to the cross-section of the threads 22.

A guide or alignment portion 46 is formed adjacent to the portion 44 and extends to end 52. Portion 46 is frusto-conical shaped and has an apex angle B. In the preferred embodiment apex angle B is equal to the apex angle A of the portion 20 and angle of portion 42. This surface or portion 46 is closely dimensioned to the major pitch of the threads 22 and the guide portion 20 and thus when two sections of pipe are being coupled together the threads 22 and portion 20 engage and are guided by surface 46 to provide axial alignment of the two sections and contributes to the proper alignment of the threads 22 and 44 to prevent cross-threading thereof. This alignment function of the engaging surfaces on the ends 12 and 14 facilitates the connection process and reduces the time and labor required to make such an assembly.

According to a particular feature of the present invention end 14 is provided with indicia on the exterior thereof in the area of the guide portin 20 to indicate the amount of telescope threaded engagement of the two sections during the assembly process. These indicia in the preferred embodiment appear as axially spaced lines 48 and 50 extending around the surface 20 as shown in FIG. 4. During connection of the end 14 of the section 10 and the end 12' and section 10' the end 52' will first align with the indicia 48. Further engagement of the thread will cause end 52' to align with the indicia 50.

According to a particular feature of the present invention when the end 52' aligns with the indicia 48 effective sealing is present in the pipe and the workman knows that he is beginning the area of acceptable engagement for an effective sealing. Further relative axial rotation of the section 10 and 10' will cause the seal 28 to move longitudinally into the section 12 in the direction of arrow 54 while remaining in contact with the surface 42. Since the surface 42 tapers inwardly as shown in FIG. 3 further movement in the direction of arrow 54 will cause additional compression of the seal 28. This tightening of the sections can be continued until the end 52' aligns with the indicia 50, thus indicating to the workman that the two sections are completely engaged. To align a fitting on the end of one of the sections 10 or 10' in a desired direction the threaded engagement can be unscrewed or backed off to some extent. The workman knows by observing the indicia how far the two sections can be backed off while still maintaining an effective seal.

According to a particular feature of the present invention the relative rotation between the two sections provided between the two indicia 40 and 48, is at least one full turn or 360 degrees. This feature provides for orientation of the fitting on the end of the section in any direction while still maintaining an effective seal. This is accomplished by relating the lead of the threads 22 and 44 and the angle of the sealing surface 42 such that the allowable diametric clearance between the surface 24 and the surface 42 is within the normal operational range for the particular seal 28 through at least 360 degrees of relative rotation between the two sections. The allowable diametric clearance for the particular seal 28 can be determined by testing or by reference to the seal manufacturer's specification.

The structure providing this wll be described in more detail by reference to FIGS. 5 and 6 which are enlarged views of two threads. In FIG. 5, sections 10 and 10' are shown inter-engaged to the point where the seal 28 has been sufficiently compressed by the surface 42' to a point where the diametric clearance between the surfaces 24 and 42' is equal to $E_0$. As shown, the sections 10 and 10' are threadedly engaged to a point where at least one full turn or one thread of engagement remains before full engagement. By appropriately dimensioning the size and axial position of surfaces 24, 42' and the threads, the diametric clearance $E_1$ can be selected to be within the acceptable design parameters of the particular seal 28 to provide an effective seal between the surfaces 24 and 42'. In the preferred embodiment the configuration in FIG. 5 would be reached when the end 52' is in alignment with the indicia 48. Thus, the workman performing the assembly of the sections would know that he had reached the point where an effective seal was present between the sections 10 and 10'. Further relative axial rotation of the sections would cause further axial movement of the section and seal 28 in the direction of arrow 54 into the section 10'. Since the surface 42 is frusto-conical shaped and has an apex angle $\theta$ the seal will be further compressed by this movement.

In FIG. 6 the sections 10 and 10' are shown with full thread engagement of the two sections and the seal moved further into section 10' to a point where the diametric clearance E is virtually zero. By selecting the lead L such that the diametric clearances E is within the design parameters of the particular seal 28 during an axial movement of distance L or within one thread of full makeup, one complete relative revolution of the two sections can be obtained while providing effective sealing therebetween. It has been found that the apex angle $\theta$ of the sealing surface is less than the angle X where $\tan X = E/L$ and $X < 90°$. L is equal to the lead of the thread and E is equal to the maximum allowable diametric clearance. In the present embodiment the effective diametric clearance, E, for the particular seal 28 is maintained through one complete relative revolution of the two sections when the thread lead, L=0.25 inch and the angle $\theta$ is 0 degrees and 30'.

Thus the pipe section of the present invention provides ends which can be connected to another section and provide at least 360 degrees of relative axial adjustment between the sections while providing an effective sealing.

In accordance with another aspect of the present invention it has been found that by relating the apex angle of the sealing surface to the lead of the threads that the torque required to make up a joint to provide an effective seal can be less than the torque an ordinary worker can apply solely by hand to the sections whereby the hand makeup of the connections are possible. By reducing the apex angle and decreasing the lead the amount of torque required can be reduced. In the present invention the provision of a seal engaging surface 42 whose apex angle $\theta$ is 0 degrees and 30 min. and thread with a lead of one-fourth in/rev. provided a mechanical advantage such that the torque which must be applied to the sections necessary to compress the seal is within the range of possibility of one worker applying a torque to the pipe by hand without the use of additional equipment or tools.

It has been found that the makeup torques for joints of this type for 2 inch pipe is in the range of 70 to 90 inch pounds. In the present embodiment the makeup torque is 80 inch pounds. All the above torques are in the range which can be applied by hand by an ordinary worker to the exterior of the pipe without tools. In a 3 inch pipe it has been found that the torque in the range of 110 to 130 inch pounds can be applied by hand. In such a 3 inch embodiment the makeup torque is 120 inch pounds. In the 4 inch pipe a torque in the range of 140 to 160 inch pounds can be applied by hand, with present embodiment the makeup torque is 150 inch pounds.

It is believed that other sizes could be designed which would have a necessary makeup torque in the range that can be applied by an ordinary worker without the use of equipment or wrenches or the like.

Therefore, according to the present invention, a pipe section is provided which is versatile in application, in that, the joints between the sections and the joints between the sections and fittings are such that 360 degrees of axial relative rotation between sections can be provided to allow for adjustment of the directions of fittings on the end of the sections. This is accomplished by relating the apex angle of the sealing surface to the diametric clearance of the seal and the lead of the screw.

In addition, the pipe section of the present invention is particularly designed and the lead of the threads, sealing surface apex angle and compressibility of the seal are selected to allow the sections to provide hand makeup thus reducing the amount of labor and time required to properly install the sections and eliminating the possibility of damaging the pipe with wrenches. In addition, the improved pipe section of the present invention provides an indicia on the exterior of the pipe to indicate to the worker when the sections are properly connected.

It should be understood, of course, that the foregoing disclosure relates only to a preferred embodiment of the present invention and that numerous modifications or alternations may be made therein without departing from the spirit and scope of the invention as set forth in the appended claims.

What is claimed is:

1. An oilfield flow line pipe section with connection means on the ends thereof for connecting a plurality of sections together in series, said section comprising:
   a length of tubing, mating male and female threads formed on the tubing adjacent the ends thereon for use in connecting the sections together;
   an annular seal supporting surface in said tubing on one end thereof;
   a seal engaging surface in said tubing in the end opposite said seal supporting surface, said seal engaging surface having a frusto-conical shape; and
   a compressible seal means mounted on said seal supporting surface of said tubing, said seal means being positioned on said tubing to be compressed between the seal engaging surface of one section and the seal supporting surface of another section when the two sections are connected together by the mating male and female threads, said seal means being of a size to provide effective sealing over a range of diametric clearances between the seal engaging surface of one section and the mating seal supporting surface of a connected section, and said seal engaging surface having an apex angle whose value is no greater than the angle $\theta$ and where $\theta$ is greater than 0° and less than 90° and where Tan $\theta$ equals the normal operational range of diametric clearance between the seal engaging and seal supporting surfaces for effective sealing divided by the lead of the male and female threads on the end of the tubing whereby interconnected sections can be relatively rotated at least one full turn while still providing a seal therebetween.

2. The pipe of claim 1 wherein said seal means is mounted adjacent the end having said male threads thereon and said seal surface means is positioned adjacent the end having said female threads thereon.

3. The pipe of claim 1 wherein said seal means comprises an annular seal member and wherein a groove receiving said seal means is formed on said tubing and is positioned adjacent to said male threads on the end opposite the end containing the female threads.

4. In an oilfield flow line pipe section having a combination connection means on the ends thereof for connecting a plurality of sections together in series, a length of tubing, mating male and female threads formed on the tubing adjacent the ends thereon for use in connecting the sections together;
 an annular seal supporting surface in said tubing on one end thereof;
 a frusto-conical shaped seal engaging surface in said tubing in the end opposite said seal supporting surface; and
 a compressible seal means mounted on said seal supporting surface of said tubing, said seal means being positioned on said tubing to be compressed between the seal engaging surface of one section and the seal supporting surface of another section when the two sections are connected together by the mating male and female threads, said seal means being of a size to provide effective sealing over a range of diametric clearances between the seal engaging surface of one section and the mating seal supporting surface of a connected section, the improvement which comprises, said seal engaging surface having an apex angle whose value is no greater than the angle $\theta$ and where $\theta$ is greater than 0° and less than 90° and where Tan $\theta$ equals the normal operational range of diametric clearance between the seal engaging and seal supporting surfaces for effective sealing divided by the lead of the male and female threads on the end of the tubing whereby interconnected sections can be reatively rotated at least one full turn while still providing a seal therebetween.

5. An oilfield flow line pipe section with connection means on the end thereof for releasably connecting a plurality of sections together in series, said section comprising:
 a length of tubing, mating male and female threads formed on said tubing adjacent to ends thereof for use in releasably connecting sections together;
 an elastomeric compressible seal means carried by said tubing adjacent one end thereof for sealing connections to other sections;
 a frusto-conical sealing surface means formed on the tubing adjacent the end opposite said compressible seal means for sealingly engaging said seal means on an adjacent connected section; and
 wherein the apex angle of the cone of the sealing surface is greater than 0°, the compressibility of the seal, the lead of and the friction between the threads and the outside diameter of the pipe are so interrelated that the necessary torque to connect the sections together by threaded engagement and to provide an effective seal by compression of the seal means is less than 45 inch pounds per inch of pipe diameter whereby hand makeup of the connection is possible.

6. The pipe section of claim 5 wherein the torque on a two inch section of pipe is in the range of 70 to 90 inch pounds.

7. The pipe section of claim 5 wherein the torque on a two inch pipe is 80 inch pounds.

8. The pipe section of claim 5 wherein the torque on a three inch section of pipe is in the range of 110 to 130 inch pounds.

9. The pipe sections of claim 5 wherein the torque on a three inch section of pipe is a 120 inch pounds.

10. The pipe section of claim 5 wherein the torque on a four inch section of pipe is in the range of 140 to 160 inch pounds.

11. The pipe section of claim 5 wherein the torque on a four inch section of pipe is 150 inch pounds.

12. The pipe of claim 5 wherein said means mounting are provided for mounting said seal means for providing effective sealing during at least one full turn of relative axial rotation between two connected sections.

13. The pipe of claim 5 wherein said the lead of the threads is additionally related to the apex angle of the sealing surface means and to the amount of allowable diametric clearance for providing effective sealing of the seal means during at least 360 degrees of relative axial rotation between two connected sections while providing thread engagement whereby interconnected sections may be relatively rotated at least one full turn without affecting the seal therebetween.

14. In an oilfield flow line pipe section with connection means on the ends thereof for releasably connecting a plurality of sections together in series having a length of tubing, mating male and female threads formed on said section adjacent the ends thereof for use in releasably connecting sections together; an elastomeric compressible seal means carried by said tubing adjacent one end thereof for sealing connections to other sections; a frusto-conical sealing surface means formed on the tubing adjacent the end opposite said compressible seal means for sealingly engaging said seal means on an adjacent connected section; the improvement which comprises the apex angle of the cone of the sealing surface, the compressibility of the seal, the lead of and friction between the threads and the diameter of the pipe are so interrelated that the necessary torque to connect two sections together by threaded engagement and to provide an effective seal by compression of the seal means is less than 45 inch pounds per inch of pipe diameter whereby hand makeup of the connection is possible.

15. The pipe section of claim 14 wherein the torque on a two inch section of pipe is in the range of 70 to 90 inch pounds.

16. The pipe section of claim 14 wherein the torque on a two inch pipe is 80 inch pounds.

17. The pipe section of claim 14 wherein the torque on a three inch section of pipe is in the range of 110 to 130 inch pounds.

18. The pipe sections of claim 14 wherein the torque on a three inch section of pipe is a 120 inch pounds.

19. The pipe section of claim 14 wherein the torque on a four inch section of pipe is in the range of 140 to 160 inch pounds.

20. The pipe section of claim 14 wherein the torque on a four inch section of pipe is 150 inch pounds.

21. The pipe of claim 14 wherein mounting means are provided for mounting said seal means for providing effective sealing during at least one full turn of relative axial rotation between two connected sections.

22. The pipe of claim 14 wherein said the lead of the threads is additionally related to the apex angle of the sealing surface means and to the amount of allowable diametric clearance for providing effective sealing of the seal means during at least 360 degrees of relative axial rotation between two connected sections while providing thread engagement whereby interconnected sections may be relatively rotated at least one full turn without affecting the seal therebetween.

23. An oilfield flow line pipe section as defined in claim 4 wherein the improvement further comprises an indicia means on said tubing visible during assembly of two sections of tubing to indicate the range of allowable thread engagement providing effective sealing.

24. The section of claim 23 wherein said indicia is located adjacent the male end of said section.

* * * * *